United States Patent
Bristow

(10) Patent No.: US 11,523,612 B2
(45) Date of Patent: Dec. 13, 2022

(54) PESTICIDAL COMPOSITION COMPRISING OXIME CARBAMATE AND USE THEREOF

(71) Applicant: JIANGSU ROTAM CHEMISTRY CO., LTD, Jiangsu (CN)

(72) Inventor: James Timothy Bristow, Chai Wan (HK)

(73) Assignee: JIANGSU ROTAM CHEMISTRY CO., LTD., Jiangsu (CN)

( * ) Notice: Subject to any disclaimer, the term of this patent is extended or adjusted under 35 U.S.C. 154(b) by 55 days.

(21) Appl. No.: 16/649,451

(22) PCT Filed: Sep. 18, 2018

(86) PCT No.: PCT/CN2018/106129
§ 371 (c)(1),
(2) Date: Mar. 20, 2020

(87) PCT Pub. No.: WO2019/057022
PCT Pub. Date: Mar. 28, 2019

(65) Prior Publication Data
US 2020/0275662 A1   Sep. 3, 2020

(30) Foreign Application Priority Data
Sep. 20, 2017 (GB) .................................. 1715183

(51) Int. Cl.
*A01N 47/24* (2006.01)
*A01N 43/28* (2006.01)

(52) U.S. Cl.
CPC ............ *A01N 47/24* (2013.01); *A01N 43/28* (2013.01)

(58) Field of Classification Search
None
See application file for complete search history.

(56) References Cited

U.S. PATENT DOCUMENTS

| | | | |
|---|---|---|---|
| 3,530,220 A | 9/1970 | Buchanan | |
| 3,576,834 A | 4/1971 | Buchanan | |
| 3,639,633 A | 2/1972 | Buchanan | |
| 3,862,316 A | 1/1975 | Armstrong | |
| 3,920,442 A * | 11/1975 | Albert | A01N 25/12 504/243 |
| 4,032,654 A | 6/1977 | Corty | |
| 4,399,122 A | 8/1983 | Tocker | |
| 4,481,215 A | 11/1984 | Tocker | |
| 10,375,951 B2 * | 8/2019 | Tsukamoto | A01N 43/40 |
| 10,568,329 B2 * | 2/2020 | Bristow | A61K 31/222 |
| 11,407,691 B2 * | 8/2022 | Bristow | A01N 43/90 |
| 2005/0096224 A1 * | 5/2005 | Dawkins | A01N 25/30 504/100 |
| 2008/0287534 A1 | 11/2008 | Claus et al. | |
| 2017/0341995 A1 | 11/2017 | Bristow | |

FOREIGN PATENT DOCUMENTS

| | | | |
|---|---|---|---|
| CN | 103004821 A | 4/2013 | |
| CN | 103039471 A | 4/2013 | |
| CN | 103039474 A | 4/2013 | |
| CN | 103518754 A | 1/2014 | |
| EP | 0025255 A1 | 3/1981 | |
| EP | 0097464 A1 | 1/1984 | |
| EP | 0189588 A2 | 8/1986 | |
| GB | 1449772 A | 9/1976 | |
| WO | 9939581 A1 | 8/1999 | |
| WO | WO-9939581 A1 * | 8/1999 | ............ A01N 47/24 |
| WO | 03069991 A2 | 8/2003 | |
| WO | 2019057022 A1 | 3/2019 | |

OTHER PUBLICATIONS

National Center for Biotechnology Information. "PubChem Compound Summary for CID 9595287, Vydate" PubChem, https://pubchem.ncbi.nlm.nih.gov/compound/Vydate. Accessed Jul. 23, 2021. Created Oct. 24, 2006. (Year: 2006).*
Edited by Richard P Pohanish, (2015), "Sittig's Handbook of Pesticides and Agricultural Chemicals: Second Edition", Elsevier Inc., The Boulevard, Langford Lane, Kidlington, Oxford OX5 1GB, UK, pp. 622-624. (Year: 2015).*
Deer et al., "Effect of Water pH on the Chemical Stability of Pesticides", Jul. 2001, https://digitalcommons.usu.edu/cgi/viewcontent.cgi?article=1074&context=extension_histall (Year: 2001).*
Strathmann et al., "Reduction of the Carbamate Pesticides Oxamyl and Methomyl by Dissolved Fe(II) and Cu(I)", 2001, Environmental Science & Technology, 35(12), pp. 2461-2469. (Year: 2001).*
Strathmann et al., "Reduction of the Pesticides Oxamyl and Methomyl by FeII: Effect of pH and Inorganic Ligands", 2002, Environmental Science & Technology, 36(4), pp. 653-661. (Year: 2002).*
International Search Report corresponding to PCT/CN2018/106129 dated Dec. 25, 2018.
British Office Action with Combined Search and Examination Report corresponding to Application No. GB1715183.8 dated Mar. 20, 2018.

(Continued)

Primary Examiner — My-Chau T. Tran
(74) Attorney, Agent, or Firm — Dickinson Wright PLLC

(57) ABSTRACT

A liquid soluble concentrate (SL) composition is provided, the composition comprising: i) an oxime carbamate; and ii) a liquid carrier, the liquid carrier comprising a solvent system comprising an alcohol, a carbonate ester and water. A method of treating pests using the composition is also provided.

19 Claims, No Drawings

(56) References Cited

OTHER PUBLICATIONS

Colombian Office Action corresponding to NC2020/0004525 dated Apr. 27, 2020.
John Harvey, Jr., et al., Decomposition of Oxamyl in Soil and Water, J. Agric. Food Chem, American Chemical Society, 1978, pp. 536-541, vol. 26, No. 3.
Second Colombian Office Action with English translation dated Jun. 16, 2022 for Colombian Application No. NC2020/0004525, 13 pages.

\* cited by examiner

PESTICIDAL COMPOSITION COMPRISING OXIME CARBAMATE AND USE THEREOF

CROSS REFERENCE TO RELATED APPLICATIONS

This application is a 371 national phase entry of PCT/CN2018/106129, filed Sep. 18, 2018, which claims the priority of GB Patent Application No. 1715183.8, filed on Sep. 20, 2017, and titled with "PESTICIDAL COMPOSITION COMPRISING AN OXIME CARBAMATE AND THE USE THEREOF", and the disclosures of which are hereby incorporated by reference.

FIELD

The present invention relates to a pesticidal composition comprising an oxime carbamate. The present invention further relates to methods for treating pest infestations and to the use of the pesticidal composition.

BACKGROUND

Oxime carbamates are a known class of pesticidally active compounds. They are known to exhibit activity as insecticides, acaricides and miticides. Their use in the control of pest infestations in plants, in particular crop plants, is known in the art. Pesticidal formulations comprising oxime carbamates are commercially available.

For example, methyl 2-(dimethylamino)-N-[[(methylamino)carbonyl]oxy]-2-oxoethanimidothioate is an oxime carbamate compound having the common name oxamyl and having the following structure:

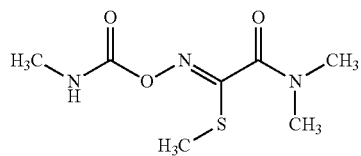

Oxamyl may be prepared using techniques disclosed in U.S. Pat. Nos. 3,576,834, 3,639,633 and 3,530,220. Oxamyl is known to be active as an acaricide, an insecticide and a nematicide. Formulations comprising oxamyl as the active ingredient are known in the art and are available commercially. For example, Vydate® 10G is a commercial granule formulation available from E.I. DuPont de Nemours containing 10% by weight oxamyl. Vydate® L is a liquid concentrate formulation comprising 24% by weight oxamyl.

EP 0 025 255 discloses an insecticidal or nematicidal composition comprising particles of an inert carrier, oxamyl and a barrier material, the barrier material capable of providing a controlled release of oxamyl in water.

US 2008/0287534 concerns the control of foliar insect pests using a mixture of oxamyl with methyl N-[[(methylamino)carbonyl]oxy]ethanimidothioate (methomyl). Oxamyl and methomyl may be applied together or separately. Suitable formulations include compositions comprising a least one liquid diluent, a solid diluent or a surfactant.

US 2005/0096224 discloses a method for controlling invertebrate pests and/or fungal diseases affecting potatoes and other crops. The method employs a range of active ingredients, in particular oxamyl. The active ingredients may be applied in a range of formulations, including liquid formulations comprising a diluent. Suitable liquid diluents are indicated in US 2005/0096224 as being water, N,N-dimethylformamide, dimethyl sulfoxide, N-alkylpyrrolidone, ethylene glycol, polypropylene glycol, propylene carbonate, dibasic esters, paraffins, alkylbenzenes, alkylnaphthalenes, oils of olive, castor, linseed, tung, sesame, corn, peanut, cotton-seed, soybean, rape-seed and coconut, fatty acid esters, ketones such as cyclohexanone, 2-heptanone, isophorone and 4-hydroxy-4-methyl-2-pentanone, and alcohols such as methanol, cyclohexanol, decanol, benzyl and tetrahydrofurfuryl alcohol. A liquid formulation comprising water as the sole diluent is specifically exemplified in US 2005/0096224.

Insecticidal compositions having high concentrations of active ingredients are disclosed in U.S. Pat. No. 4,481,215. The compositions comprise carbamate insecticides as active ingredients, in particular methomyl. Other carbamate insecticides include oxamyl and aldicarb. The compositions of U.S. Pat. No. 4,481,215 are prepared by reacting the carbamate insecticide with formaldehyde or paraformaldehyde in the presence of a very limited amount of water and a base. In one embodiment of U.S. Pat. No. 4,481,215 oxamyl was combined with paraformaldehyde in water and treated with aqueous sodium hydroxide while heating at 45° C. for one hour. The pH of the mixture was then adjusted to 6.7 with acetic acid. Excess formaldehyde was removed by the addition of urea.

U.S. Pat. No. 4,032,654 discloses water-soluble liquid concentrates of methomyl and oxamyl dissolved in designated solvents at a pH of about 2.8 to 3.2. Higher amounts of methomyl and oxamyl are said to be dissolved, compared with the total amount of these compounds that can be dissolved separately. Solvent systems disclosed in U.S. Pat. No. 4,032,654 are methanol/water, acetone/water, and cyclohexanone/cyclohexanol/methanol/water. The pH of from 2.8 to 3.2 is achieved using an acid, in particular acetic acid, citric acid, sulphuric acid and, most preferably phosphoric acid.

The decomposition of oxamyl in soil and in water is discussed by Harvey, J., et al., 'Decomposition of Oxamyl in Soil and Water', J. Agric. Food Chem., Vol. 26, No. 3, 1978, pages 536 to 541.

Formulating oxime carbamates in liquid compositions offers advantages to end users, in particular when diluting the composition for application, for example by spraying on a locus. However, it has been found that the stability of oxime carbmates, such as oxamyl, in liquid formulations can be low. This instability reduces the effective amount of oxamyl available for treatment of the target plants. This in turn results either a reduced effectiveness of the composition or the need to increase the application rate of the composition.

As a result, it would be advantageous if a stable liquid formulation of oxime carbamates, such as oxamyl, could be provided, which formulation maintains a high effectiveness for the end user and which avoids the need for applying the formulation at higher application rates. It would also be advantageous if the formulation could contain a high amount of the oxime carbamate active ingredient in solution, which in turn reduces the volume of the liquid concentrate formulation that is required to treat a locus at a given application rate of active ingredients.

SUMMARY

Surprisingly, it has now been found that a liquid formulation, in particular a soluble concentrate (SL) formulation, having a high concentration of an oxime carbamate and exhibiting a high stability is obtained using a novel solvent system. It has also been found that the novel solvent system can enhance the activity of the oxime carbamate active ingredient in the treatment of pest infestations of plants.

In a first aspect, the present invention provides a liquid soluble concentrate (SL) composition comprising:

i) an oxime carbamate; and ii) a liquid carrier, the liquid carrier comprising a solvent system comprising an alcohol, a carbonate ester and water.

The composition of the present invention is a liquid soluble concentrate (SL) formulation. In use, the formulation is diluted with a liquid, most typically water, for application to a locus and/or plants to be treated, for example by spraying. An advantage of the composition of the present invention is that it is readily dispersed and dissolved in water, when diluted. This provides a significant advantage to end users in the field.

The composition comprises oxime carbamate as an active pesticidal component.

Suitable oxime carbamates are known in the art and are commercially available. Examples of suitable oxime carbamates include alanycarb, aldicarb, aldoxycarb, butocarboxim, butoxycarboxim, methomyl, nitrilcarb, oxamyl, tazimcarb, thiocarboxime, thiodicarb and thiofanox. Preferred oxime carbamates for use in the present invention include oxamyl and methomyl. Oxamyl is a particularly preferred oxime carbamate.

The composition may comprise a single oxime carbamate. Alternatively, two or more oxime carbamates may be present in the composition.

The oxime carbamate is present in the composition in solution, dissolved in the liquid carrier. The oxime carbamate may be present in the composition in any suitable amount. The amount of the oxime carbamate may be limited by such factors as the solubility of the oxime carbamate in the liquid carrier, which in turn depends upon the liquid carrier employed.

The oxime carbamate may be present in the composition in an amount of up to 60% by weight, preferably up to 55%, more preferably up to 50%, still more preferably up to 45% by weight. Compositions having an oxime carbamate content of up to 50% by weight, preferably up to 45% are preferred. Compositions having a lower oxime carbamate content, such as up to 30% by weight, for example up to 25% by weight, are also particularly useful. The oxime carbamate may be present in the composition in an amount of at least 5% by weight, preferably at least 10%, more preferably at least 15%, still more preferably at least 20% by weight. Very suitable compositions may have an oxime carbamate present in an amount of from 5 to 60% by weight, preferably from 10 to 50% by weight, more preferably from 15 to 45% by weight.

The composition of the present invention may further comprise an electrolyte. The electrolyte may be any suitable compound that is soluble in the liquid carrier and dissociates to form ionic species. One preferred class of electrolytes are acids, in particular organic acids. Preferred organic acids include carboxylic acids. The carboxylic acid may be a monocarboxylic acid or comprise a plurality of —COOH groups, for example the dicarboxylic acids. Suitable carboxylic acids have from 1 to 12 carbon atoms, preferably from 1 to 10 carbon atoms, more preferably from 1 to 8 carbon atoms. The carboxylic acids may be aliphatic, alicyclic or aromatic. Aliphatic carboxylic acids may be straight chain or branched. Examples of preferred monocarboxylic acids include formic acid, acetic acid, propionoic acid, butyric acid, valeric acid, caproic acid and benzoic acid. Examples of preferred dicarboxlylic acids include oxalic acid and malic acid. Higher carboxylic acids include tricarboxylic acids, such as citric acid.

Particularly preferred organic acids are alphatic acids, in particular aliphatic acids having from 1 to 6 carbon atoms, preferably from 1 to 4 carbon atoms, with acetic acid being especially preferred.

The composition of the present invention is preferably acidic. Preferred pH values for the composition are up to 6.5, more preferably up to 6.0, still more preferably up to 5.5, more preferably still up to 5.0, especially up to 4.5, more especially up to 4.0. A pH of above 2.0 is preferred, more preferably above 2.5, still more preferably above 3.0. A pH in the range of from 2.0 to 6.0 is preferred, more preferably from 2.5 to 5.0, still more preferably from 3.0 to 4.0. A pH of about 3.5 is particularly preferred for many applications.

The composition of the present invention further includes a liquid carrier comprising a solvent system. The oxime carbamate active ingredient is soluble in the solvent system. It is a particular advantage of the composition that the solvent system is one in which oxime carbamates are very soluble, allowing the oxime carbamate to be present in the composition in high amounts.

The composition may comprise the liquid carrier in an amount of up to 90% by weight, preferably up to 85%, more preferably up to 80% by weight. The composition may comprise the liquid carrier in an amount of from 30%, preferably from 35%, more preferably from 40%, still more preferably from 45% by weight. The liquid carrier may be present in an amount of from 30 to 90% by weight, preferably from 35 to 85%, more preferably from 40 to 80%, still more preferably from 45 to 75% by weight. In one embodiment, the liquid carrier is present in an amount of from 45 to 65% by weight, preferably from 50 to 60%, especially about 55% by weight. In a further embodiment, the liquid carrier is present in an amount of from 65 to 85% by weight, preferably from 70 to 80% by weight, especially about 75% by weight.

The liquid carrier comprises a solvent system. The solvent system comprises an alcohol, a carbonate ester and water.

Suitable alcohols for use in the solvent system include aliphatic, alicyclic and aromatic alcohols. Aliphatic and alicyclic alcohols may be saturated or have a degree of unsaturation. Saturated aliphatic and alicyclic alcohols are preferred. Aliphatic alcohols are preferred. The aliphatic alcohols may be straight chained or branched chained. Straight chained aliphatic alcohols are preferred for use in many embodiments.

The alcohol may be a monohydric alcohol or a polyhydric alcohol, having two or more hydroxyl groups. Monohydric alcohols are preferred.

The alcohol may have from 1 to 12 carbon atoms, preferably from 1 to 10, more preferably from 1 to 8 carbon atoms, still more preferably from 1 to 6 carbon atoms. Particularly preferred alcohols include methanol, ethanol, propanol, butanol, pentanol and hexanol. C1 to C4 alcohols are particularly preferred, especially methanol, ethanol and propanol. Methanol and ethanol are particularly suitable alcohols, with methanol being especially preferred.

The solvent system may comprise a single alcohol or a mixture of two or more alcohols.

The alcohol may be present in the composition in an amount of up to 65% by weight, preferably up to 60%, more preferably up to 55%, still more preferably up to 50% by weight. The alcohol may be present in the composition in an amount of from 3% by weight, preferably from 4% by weight, more preferably from 5% by weight. An alcohol content of from 3 to 65% is suitable for many embodiments, preferably from 4 to 60%, more preferably from 5 to 55%, still more preferably from 5 to 50% by weight. An alcohol content of from 18 to 22% by weight is particularly suitable for some embodiments, especially about 20% by weight of the composition.

Suitable carbonate esters for use in the solvent system include dialkyl and diaryl carbonate esters, having a carbonate group with two R substituents, in which each R substituent is an alkyl group or an aryl group. Suitable carbonate esters also include carbonate esters in which two carbonate groups are linked by an aliphatic or aromatic bifunctional group. Preferably, the carbonate ester is one in which the carbonate groups are linked by a 2- or 3-carbon bridge, more preferably a 2-carbon bridge. Preferred carbonate esters have the following general formula:

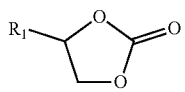

In the above formula, R1 may be selected from hydrogen or a lower alkyl group, preferably a C1 to C6 alkyl group, more preferably a C1 to C4 alkyl group, still more preferably an alkyl group having one, two or three carbon atoms, especially one or two carbon atoms. Propylene carbonate, that is a compound of the above formula in which R1 is methyl, is particularly preferred.

The solvent system may comprise a single carbonate ester or a mixture of two or more carbonate esters.

The carbonate ester may be present in the composition in an amount of up to 65% by weight, preferably up to 60%, more preferably up to 55%, still more preferably up to 50% by weight. The carbonate ester may be present in the composition in an amount of from 2% by weight, preferably from 4% by weight, more preferably from 5% by weight. A carbonate ester content of from 2 to 65% is suitable for many embodiments, preferably from 3 to 60%, more preferably from 4 to 55%, still more preferably from 5 to 50% by weight. A carbonate ester content of from 6 to 18% by weight is particularly suitable for many embodiments, preferably from 7 to 17%, especially from 8 to 16% by weight of the composition. In one embodiment, a carbonate ester content of about 9% by weight is preferred. In another embodiment, a carbonate ester content of about 15% by weight is preferred. In other embodiments, carbonate ester contents of about 20, 35 and 50% by weight are preferred.

The solvent system further comprises water. Water may be present in the composition in an amount of up to 75% by weight, preferably up to 70%, more preferably up to 65%, still more preferably up to 60% by weight. Water may be present in the composition in an amount of from 3% by weight, preferably from 4% by weight, more preferably from 5% by weight. A water content of from 3 to 75% is suitable for many embodiments, preferably from 4 to 70%, more preferably from 5 to 65%, still more preferably from 5 to 60% by weight. A water content of from 15 to 50% by weight is particularly suitable for many embodiments, preferably from 17 to 47%. In one embodiment, a water content of from 15 to 30%, preferably from 17 to 25%, especially about 20% by weight is preferred. In another embodiment, a water content of from 35 to 55%, preferably from 40 to 50%, especially about 45% by weight is preferred.

The three solvents may be present in the solvent system in any suitable amount and ratio. The relative amounts of the solvents may be selected by such factors as the amount of oxime carbamate to be dissolved.

The solvent system may comprise the alcohol in an amount of up to 75% by weight of the total solvent system present in the composition, preferably up to 70%, more preferably up to about 65% by weight. The solvent system may comprise the alcohol in an amount of from 4% by weight of the total solvent system present in the composition, preferably from 5%, more preferably from 6% by weight. The alcohol may be present in the solvent system in an amount of from 4 to 75% by weight, preferably from 5 to 70%, more preferably from 6 to 65% by weight. In one embodiment, the alcohol is present in the solvent system in an amount of from 25 to 75% by weight, preferably from 30 to 70%, still more preferably from 35 to 65% by weight. In another embodiment, the alcohol is present in the solvent system in an amount of from 20 to 35% by weight, preferably from 20 to 30%, still more preferably from 25 to 30% by weight.

The solvent system may comprise the carbonate ester in an amount of up to 75% by weight of the total solvent system present in the composition, preferably up to 70%, more preferably up to about 65% by weight. The solvent system may comprise the carbonate ester in an amount of from 4% by weight of the total solvent system present in the composition, preferably from 5%, more preferably from 6% by weight. The carbonate ester may be present in the solvent system in an amount of from 4 to 75% by weight, preferably from 5 to 70%, more preferably from 6 to 65% by weight. In one embodiment, the carbonate ester is present in the solvent system in an amount of from 15 to 35% by weight, preferably from 20 to 30%, still more preferably from 25 to 30% by weight. In another embodiment, the carbonate ester is present in the solvent system in an amount of from 5 to 25% by weight, preferably from 10 to 20%, still more preferably from 10 to 15% by weight.

The solvent system may comprise water in an amount of up to 90% by weight of the total solvent system present in the composition, preferably up to 85%, more preferably up to 80% by weight. The solvent system may comprise water in an amount of from 4% by weight of the total solvent system present in the composition, preferably from 5%, more preferably from 6% by weight. Water may be present in the solvent system in an amount of from 4 to 90% by weight, preferably from 5 to 85%, more preferably from 6 to 80% by weight. In one embodiment, water is present in the solvent system in an amount of from 40 to 75% by weight, preferably from 50 to 70%, still more preferably from 55 to 65% by weight. In another embodiment, water is present in the solvent system in an amount of from 20 to 45% by weight, preferably from 25 to 40%, still more preferably from 30 to 40% by weight.

The solvent system may comprise the alcohol and the carbonate ester in a weight ratio of from 1:10 to 10:1. The solvent system may comprise the alcohol and water in a weight ratio of from 1:8 to 8:1. The solvent system may comprise the carbonate ester and water in a weight ratio of from 1:12 to 12:1.

The soluble concentrate (SL) composition of the present invention may be formulated in ways known in the art and to the skilled person. The composition may further comprise one or more auxiliaries. Again, the inclusion and use of such auxiliaries are known in the art. In particular, the composition may further comprise one or more auxiliaries selected from surfactants, stabilizers, anti-foaming agents, anti-freezing agents, preservatives, antioxidants, and colorants. Such auxiliaries are known in the art and are commercially available. Their use in the formulation of the compositions of the present invention will be apparent to the person skilled in the art.

The composition may include one or more surfactants, which are preferably non-ionic, cationic and/or anionic in nature, and surfactant mixtures which have good emulsifying, dispersing and wetting properties, depending upon the active compound/compounds being formulated. Suitable surfactants are known in the art and are commercially available.

Suitable anionic surfactants can be both so-called water-soluble soaps and water-soluble synthetic surface-active compounds. Soaps which may be used include the alkali metal, alkaline earth metal or substituted or unsubstituted ammonium salts of higher fatty acids (C10 to C22), for example the sodium or potassium salt of oleic or stearic acid, or of natural fatty acid mixtures.

The surfactant may comprise an emulsifier, dispersant or wetting agent of ionic or nonionic type. Examples of such surfactants include salts of polyacrylic acids, salts of lignosulphonic acid, salts of phenylsulphonic or naphthalenesulphonic acids, polycondensates of ethylene oxide with fatty alcohols or with fatty acids or with fatty amines, substituted phenols, especially alkylphenols, sulphosuccinic ester salts, taurine derivatives, especially alkyltaurates, and phosphoric esters of polyethoxylated phenols or alcohols.

The composition optionally further comprises one or more polymeric stabilizers. Suitable polymeric stabilizers that may be used in the present invention include, but are not limited to, polypropylene, polyisobutylene, polyisoprene, copolymers of monoolefins and diolefins, polyacrylates, polystyrene, polyvinyl acetate, polyurethanes or polyamides. Suitable stabilizers are known in the art and commercially available.

The surfactants and polymeric stabilizers mentioned above are generally believed to impart stability to the composition, in turn allowing the composition to be formulated, stored, transported and applied.

Suitable anti-foaming agents include all substances which can normally be used for this purpose in agrochemical compositions. Suitable anti-foaming agents are known in the art and are available commercially. Particularly preferred anti-foaming agents are mixtures of polydimethylsiloxanes and perfluroalkylphosphonic acids, such as the silicone anti-foaming agents commercially available from GE or Compton.

Suitable preservatives for use in the composition of the present invention include all substances which can normally be used for this purpose in agrochemical compositions of this type and again are well known in the art. Suitable examples that may be mentioned include the commercially available preservatives PREVENTOL® (from Bayer AG) and PROXEL® (from Bayer AG).

Suitable antioxidants for use in the compositions of the present invention are all substances which can normally be used for this purpose in agrochemical compositions, as is known in the art. Preference is given to butylated hydroxytoluene.

The composition may further comprise one or more colouring agents or dyes. Suitable colouring agents and dyes are known in the art and are available commercially. One example of a suitable dye is tartrazine.

In a further aspect, the present invention provides a method for the treatment of pest infestations, in particular infestations of insects, acari and/or nematodes, at a locus, the method comprising applying to the locus a composition as hereinbefore described.

In a still further aspect, the present invention provides the use of a composition as hereinbefore described in the control of pest infestations, in particular infestations of insects, acari and/or nematodes, in plants.

The compositions employed in the practice of the present invention can be applied in a variety of ways known to those skilled in the art, at various concentrations. The method and compositions of the present invention are useful in controlling or preventing infestations of insects, acari and nematodes in plants, in particular crop plants, by applying the composition to plant materials, such as plants, plant parts and seeds, and/or the locus pre-planting, pre-emergence and/or post-emergence. The composition may be applied to the locus and/or plant materials by conventional methods including coating, spraying, sprinkling, dipping, soaking, injection, irrigation, and the like.

In general, the liquid soluble concentrate (SL) composition of the present invention is diluted with a liquid carrier, most particularly water, before being applied as hereinbefore described.

The composition may be applied to a locus to be treated in any suitable amount to obtain the desired control of pests. Typically, the composition is applied to a locus or plants to be treated in an amount to provide an application rate of the active oxime carbonate ingredient of from 300 to 5000 g/ha, preferably from 500 to 4500 g/ha.

In the method and use of the present invention, the composition can be applied to the locus where control is desired, such as to the leaves of plants and/or the surrounding soil, by a convenient method. The term "locus" refers to the place where the plants are growing, the place where the plant propagation materials of the plants are sown or the place where the plant propagation materials of the plants will be sown.

The method of the present invention may employ other pesticides, in addition to one or more oxime carbamates. For example, compositions of the present invention may contain or be mixed with other pesticides, such as herbicides, fungicides, insecticides and nematicides, growth factor enhancers and fertilizers, to enhance the activity of the present invention or to widen its spectrum of activity. Similarly, the method of the present invention may be employed in conjunction with the use of one or more of the aforementioned active ingredients, again to obtain an enhanced efficacy or broader spectrum of activity.

Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined by the appended claims.

Embodiments of the present invention will now be described, for illustrative purposes only, by way of the following examples.

Percentage figures are percent by weight, unless otherwise indicated.

DETAILED DESCRIPTION

EXAMPLES

Example 1

A soluble concentrate (SL) formulation was prepared by mixing the following components:

| | |
|---|---|
| Oxamyl (97.5% TG) | 43.0% |
| Methanol | 20.0% |
| Propylene carbonate | 15.0% |
| Acetic acid | 1.0% |
| Brilliant blue FCF (Dye) | 0.002% |
| Tartrazine (Dye) | 0.0002% |
| Water | to 100% |

The formulation had a pH of about 3.5. The formulation exhibited excellent stability.

Example 2

A soluble concentrate (SL) formulation was prepared by mixing the following components:

| | |
|---|---|
| Oxamyl (97.5% TG) | 24.6% |
| Methanol | 20.0% |
| Propylene carbonate | 9.0% |
| Acetic acid | 1.0% |
| Brilliant blue FCF (Dye) | 0.03% |
| Tartrazine (Dye) | 0.07% |
| Water | to 100% |

The formulation had a pH of about 3.5. The formulation exhibited excellent stability.

The compositions of Examples 1 and 2 were dispersed in water to form a diluted spray medium. The spray medium was sprayed on plants at a locus.

The compositions of Examples 1 and 2 were readily compatible with water and easily dispersed in water to form the spray medium. The spray medium was readily sprayed using standard spray equipment with no indication of any instability of the active components of the composition, which remained in solution.

Solubility Test 1

Oxamyl (40 g) was dissolved at room temperature in a range of solvent systems having the composition indicated in Table 1 below. Samples of each solution were kept at $-6°$ C. and $-18°$ C. for 7 days, after which the degree of crystallization or precipitation of oxamyl was observed.

The results are summarised in Table 1 below.

TABLE 1

| Solvent System | Amount of solvent (g) | Amount of oxamyl (g) | Observations at room temperature | Observations after 7 days at −6° C. | Observations after 7 days at −18° C. |
|---|---|---|---|---|---|
| Propylene Carbonate | 100 | 40 | Oxamyl not completely dissolved | — | — |
| Methanol:Water | 80:20 | 40 | Clear solution | Clear solution | Significant precipitation |
| Methanol:Water | 50:50 | 40 | Clear solution | Mild precipitation | Significant precipitation |
| Methanol:Water; Propylene Carbonate | 75:20:5 | 40 | Clear solution | Clear solution | Clear solution |
| Methanol:Water:Propylene Carbonate | 60:20:20 | 40 | Clear solution | Clear solution | Clear solution |
| Methanol:Water:Propylene Carbonate | 50:40:10 | 40 | Clear solution | Clear solution | Clear solution |
| Methanol:Water:Propylene Carbonate | 40:40:20 | 40 | Clear solution | Clear solution | Clear solution |
| Methanol:Water:Propylene Carbonate | 30:20:50 | 40 | Clear solution | Clear solution | Clear solution |
| Methanol:Water:Propylene Carbonate | 40:30:30 | 40 | Clear solution | Clear solution | Clear solution |

As can be seen from the results in Table 1, the solvent system comprising methanol, water and propylene carbonate exhibited a significantly higher solubility for oxamyl, with no precipitation of oxamyl occurring, in particular at temperatures down to −18° C.

Solubility Test 2

A range of formulations were prepared having the compositions summarised in Table 2 below.

The components were mixed to form a liquid soluble concentrate composition.

TABLE 2

| Example No. | Oxamyl (%) | Methanol (%) | Proplyene Carbonate (%) | Water (%) | Antifoam (%) |
|---|---|---|---|---|---|
| 3 | 24 | 50 | 5 | 20 | 1 |
| 4 | 24 | 10 | 5 | 60 | 1 |
| 5 | 24 | 35 | 20 | 10 | 1 |
| 6 | 24 | 10 | 20 | 35 | 1 |
| 7 | 24 | 5 | 35 | 35 | 1 |
| 8 | 24 | 35 | 35 | 5 | 1 |
| 9 | 24 | 20 | 50 | 5 | 1 |
| 10 | 24 | 5 | 50 | 25 | 1 |
| Comparative Example 1 | 24 | 50 | — | 25 | 1 |
| Comparative Example 2 | 24 | 25 | — | 50 | 1 |

The formulations summarised in Table 2 were prepared at room temperature and the condition of the composition was observed. Thereafter, each composition was held at −18° C. for a period of 7 days, after which the condition of the composition was again observed.

The results are set out in Table 3 below.

TABLE 3

| Example No. | Observations at Room Temperature | Observations at −18° C. after 7 days |
|---|---|---|
| 3 | Clear solution | Clear solution |
| 4 | Clear solution | Clear solution |
| 5 | Clear solution | Clear solution |
| 6 | Clear solution | Clear solution |
| 7 | Clear solution | Clear solution |
| 8 | Clear solution | Clear solution |
| 9 | Clear solution | Clear solution |
| 10 | Clear solution | Clear solution |
| Comparative Example 1 | Clear solution | Precipitation |
| Comparative Example 2 | Clear solution | Precipitation |

From the results set out in Table 3, it can be seen that the compositions of the present invention exhibited a high degree of stability, both at room temperature and after prolonged storage at −18° C. In contrast, the formulations comprising methanol and water as the solvent system exhibited poor stability at the low temperatures, with precipitation of oxamyl occurring.

Biological Tests

Tomato plants were planted in a field infested with root-knot nematode (*Myloidogyne incognita*). The plants were planted with the roots at 5 cm from the surface of the soil. The surface of the soil was covered in a layer of a mixture of dry sandy soil and clay in a weight ratio of 1:1. Each plant was treated by drenching with 200 mL of the test formulation. At day 2 and day 5 of the test each plant was drenched with 200 mL of water.

Test solutions were prepared using the formulations of each of Examples 3 to 10 and Comparative Examples 1 and 2, diluted in water to a concentration of active ingredient of 12 g/100 L and 24 g/100 L. An untreated plant was used as a control.

After 30 days, the growth of the untreated control was observed to ensure the nematodes were active. After 60 days, the roots of all plants were collected and weighed. Damage to each plant was also assessed and the percentage of the plant showing signs of damage was recorded.

The efficacy of the nematode control E %, for a treated plant can be defined as follows:

$$E=[(\% \text{ of plant damage to the control} - \% \text{ of plant damage to the treated plant})/(\% \text{ of plant damage to the control})] \times 100$$

The efficacy of the nematode control for each formulation is indicated in Table 4 below.

TABLE 4

| Example No. | Concentration of active ingredient applied (g ai/100 L) | Efficacy (%) |
|---|---|---|
| Control | NA | 0 |
| 3 | 12 | 83.2 |
| 3 | 24 | 98.8 |
| 4 | 12 | 82.1 |
| 4 | 24 | 99.2 |
| 5 | 12 | 68.3 |
| 5 | 24 | 86.4 |
| 6 | 12 | 85.1 |
| 6 | 24 | 98.5 |
| 7 | 12 | 83.7 |
| 7 | 24 | 98.4 |
| 8 | 12 | 82.5 |
| 8 | 24 | 98.8 |
| 9 | 12 | 84.2 |
| 9 | 24 | 98.9 |
| 10 | 12 | 83.6 |
| 10 | 24 | 99.2 |
| Comparative Example 1 | 12 | 71.7 |
| Comparative Example 1 | 24 | 85.2 |
| Comparative Example 2 | 12 | 73.6 |
| Comparative Example 2 | 24 | 84.9 |

The results set out in Table 4 show that compositions according to the present invention, employed a solvent system comprising methanol, water and propylene carbonate, exhibited significantly greater control of the nematode infestation and significantly reduced plant damage, compared with the comparative formulations.

The weight of the root material of each plant was recorded. The results are set out in Table 5 below. A higher root weight indicates the formation of root nematodes and a higher degree of activity of the nematode infestation.

TABLE 5

| Example No. | Concentration of active ingredient applied (g ai/100 L) | Root Weight (g) |
|---|---|---|
| Control | NA | 12.52 |
| 3 | 12 | 9.37 |
| 3 | 24 | 8.82 |
| 4 | 12 | 9.34 |

TABLE 5-continued

| Example No. | Concentration of active ingredient applied (g ai/100 L) | Root Weight (g) |
|---|---|---|
| 4 | 24 | 8.95 |
| 5 | 12 | 9.44 |
| 5 | 24 | 8.88 |
| 6 | 12 | 9.38 |
| 6 | 24 | 8.90 |
| 7 | 12 | 9.51 |
| 7 | 24 | 8.83 |
| 8 | 12 | 9.27 |
| 8 | 24 | 8.91 |
| 9 | 12 | 9.39 |
| 9 | 24 | 8.82 |
| 10 | 12 | 9.47 |
| 10 | 24 | 8.67 |
| Comparative Example 1 | 12 | 12.10 |
| Comparative Example 1 | 24 | 11.52 |
| Comparative Example 2 | 12 | 12.02 |
| Comparative Example 2 | 24 | 11.44 |

The results set out in Table 5 above indicate that the treatment of the plants with compositions of the present invention resulted in a lower root mass, indicating a significant reduction in the formation of root knots compared with the untreated control, in turn indicating a greater control of the nematode infestation, compared with the formulations of the comparative examples.

The invention claimed is:

1. A liquid soluble concentrate (SL) composition comprising:
   i) an oxime carbamate; and
   ii) a liquid carrier, the liquid carrier comprising a solvent system comprising an alcohol, a carbonate ester and water,
   wherein the oxime carbamate is oxamyl and present in an amount ranging from 5 to 60% by weight of the composition;
   the alcohol is selected from methanol, ethanol, propanol, butanol, pentanol and hexanol and present in an amount ranging from 5 to 50% by weight of the composition;
   the carbonate ester is propylene carbonate and present in an amount ranging from 5 to 50% by weight of the composition; and
   the water is present in an amount ranging from 5 to 60% by weight of the composition.

2. The composition according to claim 1, wherein the oxime carbamate is present in an amount of up to 45% by weight.

3. The composition according to claim 1, wherein the oxime carbamate is present in an amount of at least 20% by weight.

4. The composition according to claim 1, wherein the composition further comprises an electrolyte.

5. The composition according to claim 4, wherein the electrolyte is an organic acid.

6. The composition according to claim 5, wherein the organic is a carboxylic acid.

7. The composition according to claim 6, wherein the carboxylic acid is selected from formic acid, acetic acid, propionoic acid, butyric acid, valeric acid, caproic acid, benzoic acid, oxalic acid, malic acid and citric acid.

8. The composition according to claim 1 wherein the composition has a pH of up to 6.5.

9. The composition according to claim 8, wherein the composition has a pH of up to 4.0.

10. The composition according to claim 9, wherein the composition has a pH ranging from 3.0 to 4.0.

11. The composition according to claim 1, wherein the liquid carrier is present in an amount of up to 80% by weight of the composition.

12. The composition according to claim 1, wherein the liquid carrier is present in an amount equal to or greater than 40% by weight of the composition.

13. The composition according to claim 1, wherein the liquid carrier is present in an amount ranging from 65 to 85% by weight of the composition.

14. The composition according to claim 1, wherein the solvent system comprises methanol or ethanol.

15. The composition according to claim 1, wherein the solvent system comprises the alcohol and the carbonate ester in a weight ratio ranging from 1:10 to 10:1.

16. The composition according to claim 1, wherein the solvent system comprises the alcohol and water in a weight ratio ranging from 1:8 to 8:1.

17. The composition according to claim 1, wherein the solvent system comprises the carbonate ester and water in a weight ratio ranging from 1:12 to 12:1.

18. The composition according to claim 1, further comprising one or more auxiliaries selected from surfactants, stabilizers, anti-foaming agents, anti-freezing agents, preservatives, antioxidants, and colorants.

19. A method for the treatment of pest infestations at a locus, the method comprising applying to the locus a composition according to claim 1.

* * * * *